Feb. 9, 1943.    G. A. MASHON    2,310,251
EXPANSIBLE CHUTE
Filed Oct. 27, 1941    3 Sheets-Sheet 1
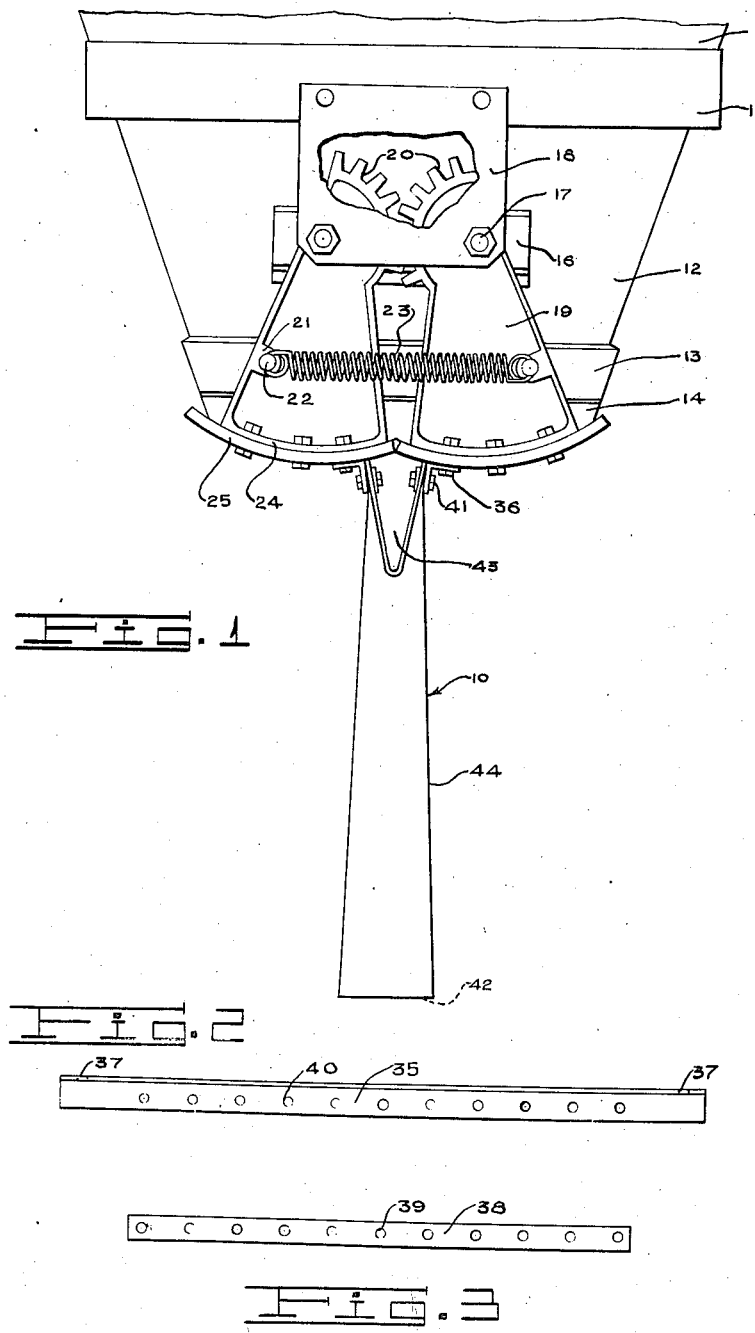
INVENTOR.
G. A. MASHON
BY Feb. 9, 1943.   G. A. MASHON   2,310,251
EXPANSIBLE CHUTE
Filed Oct. 27, 1941   3 Sheets-Sheet 2
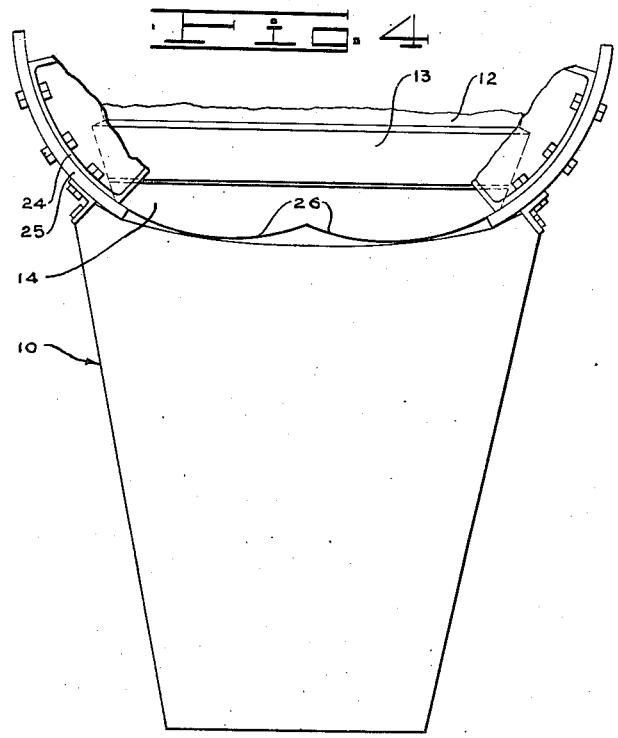
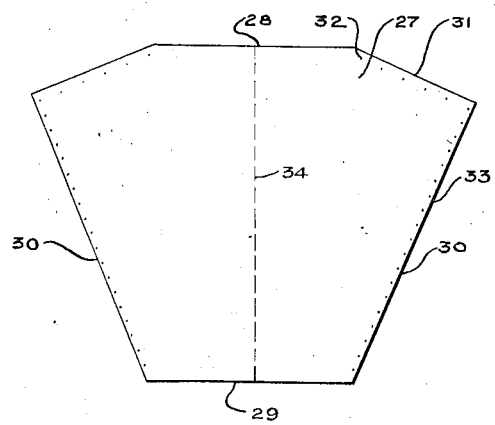
INVENTOR.
G. A. MASHON Feb. 9, 1943.                    G. A. MASHON                    2,310,251
                                EXPANSIBLE CHUTE
                            Filed Oct. 27, 1941          3 Sheets-Sheet 3
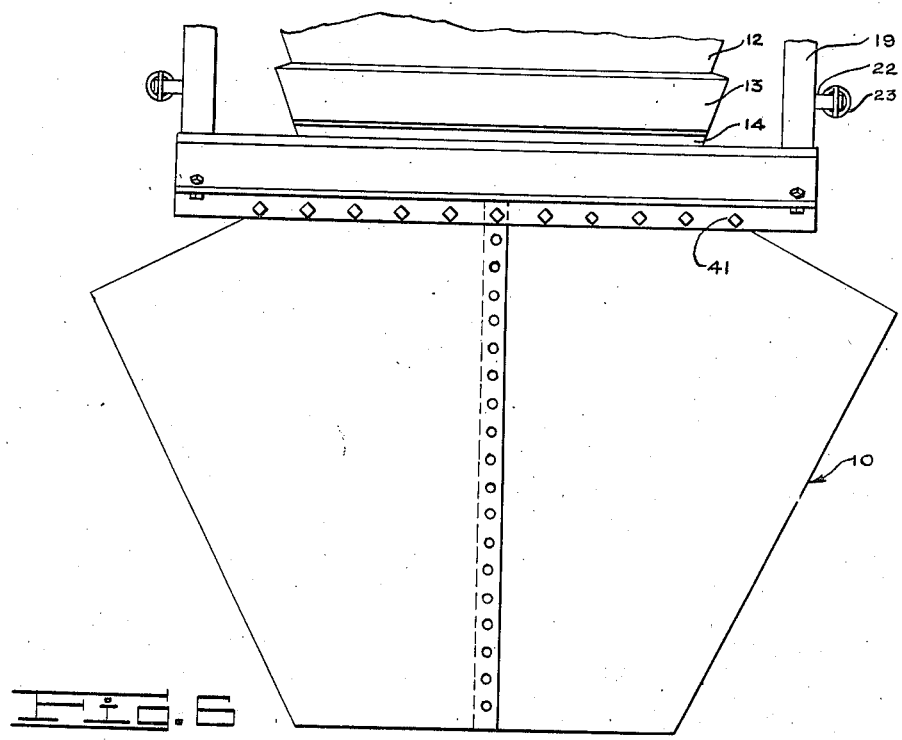
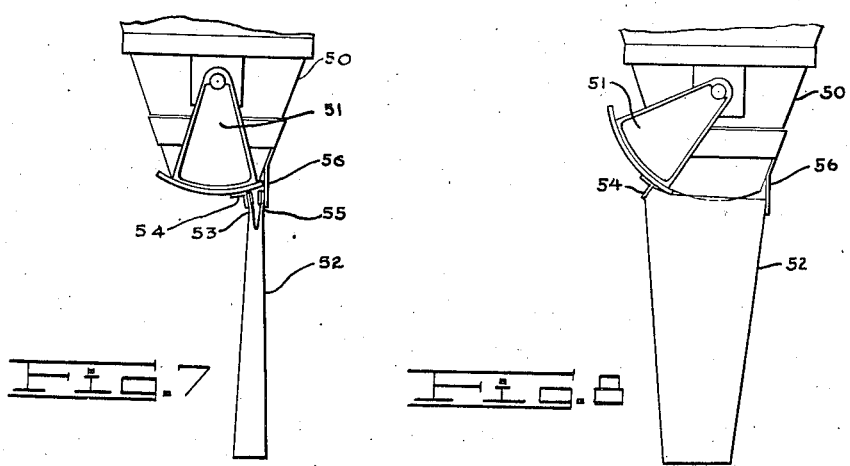
INVENTOR.
G. A. MASHON
BY

UNITED STATES PATENT OFFICE 2,310,251

EXPANSIBLE CHUTE

George A. Mashon, Los Angeles, Calif., assignor to Garlinghouse Brothers, a copartnership composed of L. H. Garlinghouse, A. F. Garlinghouse, and C. H. Jeffries Application October 27, 1941, Serial No. 416,643

6 Claims. (Cl. 193—25)

This invention relates to expansible chutes.

The general object of the invention is to provide an improved expansible chute which is particularly adapted for use with storage or discharge receptacles.

A more specific object of the invention is to provide a flexible chute construction which is adapted to be used on buckets, hoppers, or on containers of various kinds so that concrete or other material may be discharged in the proper place.

A further object of the invention is to provide an expansible chute for use with a concrete hopper wherein the chute is so arranged that it will direct concrete passing from the hopper to the proper location.

Another object of the invention is to provide a concrete hopper including a movable gate member and wherein one portion of an expansible chute is connected to the movable gate member to move therewith and another portion of the chute is supported so that an effective pouring operation is secured.

Another object of the invention is to provide a material discharge bucket or hopper with a flexible discharge member which may be folded from discharge position when not in use.

Other objects and advantages of the invention will be apparent from the following description taken in connection with the accompanying drawings wherein:

Fig. 1 is a side elevation with parts broken away showing a hopper with my expansible chute secured thereon;

Fig. 2 is a side elevation of an angle member;

Fig. 3 is a side elevation of a securing member;

Fig. 4 is a view similar to Fig. 1 showing the gate open and the chute expanded;

Fig. 5 is a plan view of one of the chute blanks;

Fig. 6 is a fragmentary front elevation showing the hopper and with the chute contracted;

Fig. 7 is a view similar to Fig. 1 showing the chute arranged on a modified hopper gate; and Fig. 8 is a view of the modification with the gate open and the chute expanded.

Referring to the drawings by reference characters, I have shown my invention as embodying in a flexible chute which is indicated generally at 10. In the accompanying drawings I have shown the chute as mounted on a hopper which is indicated at 11. As shown the hopper is in the shape of an inverted frustum of a pyramid and includes sides 12 having a rim 13 secured thereto. A second rim 14 is arranged below the rim 13. The hopper includes an upper collar 15 and a support 16 arranged below the collar 15.

The construction includes a pair of shafts 17 arranged at each side of the hopper and disposed in apertures in plates 18. The plates 18 are secured to the supports 16. The shafts 17 support arms 19 which include meshing segmental gears 20.

The arms 19 as shown include projecting bosses 21 on which pins 22 are mounted. The pins 22 are engaged by the ends of springs 23 so that the arms are continually urged together.

Any suitable construction may be employed for causing the arms to separate to thereby open the gates.

The lower end of each arm is arcuate as at 24 on radii the centers of which coincide with the axes of the shafts 17. Curved gate plates 25 are mounted on the lower ends of the arms 19. The lower edge of the rim 14 has arcuate portions 26 corresponding to the curve of the gate plates 25. The hopper construction described is fully disclosed in Patent 2,246,354 granted June 17, 1941, and the present disclosure of a hopper is merely typical of other hoppers with which my improved expansible chute may be employed.

The chute is preferably made from a pair of blanks 27 such as are shown in Fig. 5. Each blank includes a top edge 28, a bottom edge 29, lower side edges 30 and upper side edges 31. Adjacent the sides 30 and 31 I arrange aligned apertures 32 and 33 respectively through which fastening members extend.

In making the chute the blanks are folded along the line 34 Fig. 5 and the edges 30 are united as shown in Fig. 6 by suitable fastening means which pass through the apertures 33.

Mounted on the gate plates of the hopper I arrange a pair of angles 35 which are held in place by bolts 36 which pass through apertures 37 in the angles. The edges 31 of the chute are then arranged against the downwardly projecting portion of the angle and are engaged by a clamping plate 38 which has holes 39 therein and aligned with hole 33 previously mentioned. The angles also have apertures 40 therein which align with holes 32 and 39 and in these apertures I arrange bolts which serve to hold the chute in place.

The bottom of the chute is open to form a discharge aperture 42 and the top of the chute forms an opening 43 which when the chute is closed assumes the position shown in Fig. 1 with the top edges 29 flaring outwardly. As the gates are opened the upper edges of the chute straighten until when the gate is fully opened the upper edges become substantially straightened. The sides 44 of the chute are normally substantially plane when the gates are closed as shown in Fig. 1, while the ends of the chute are rounded.

In Figs. 7 and 8 I show a modification of the invention wherein a hopper 50 is provided with a single gate closure 51 instead of the pair of gates previously described. The expansible chute 52 is similar to the chute previously described and has the upper portion of one side as at 53 secured to an angle 54 in the manner previously described. The other upper edge 55 of the chute 52 is secured to a depending plate 56 on the hopper 50.

When the gate 51 is closed the expansible chute assumes the position shown in Fig. 7 and when the gate is opened, as shown in Fig. 8 the chute assumes the position shown in this figure.

My invention is particularly adapted for use in placing concrete in narrow or inaccessible forms although I do not wish to be limited to such use.

From the foregoing description it will be apparent that I have invented a novel expansible chute which can be economically manufactured and readily installed and which is highly efficient for its intended purpose.

Having thus described my invention, I claim:

1. In a hopper construction, a receptacle, said receptacle having a discharge opening, a gate movable to open and close the said opening, a chute below said opening, said chute including a pair of side members, one of said side members being connected to said gate, means to support the other side member, said chute members having end portions and having a slack portion in the upper end of the end portions when the gate is closed.

2. In a hopper construction, a receptacle, said receptacle having a discharge opening, a gate pivotally mounted and movable to open and close the said opening, a chute below said opening, said chute including a pair of side members, one of said side members being connected to said gate, means to support the other side member, said chute members having connecting end portions and having a slack portion in the connecting ends when the gate is closed, said slack portion permitting opening of the gate.

3. In a hopper construction, a receptacle, said receptacle having a discharge opening, a pair of gates pivotally mounted on said receptacle and movable to open and close the said opening, a chute below said opening, said chute including a pair of side members having a discharge aperture in the lower portion thereof, one of said side members being connected to one of said gates, the other side member being connected to the other gate, said side members being connected across the ends of the chute and each end having a slack portion in the upper part thereof when the gates are closed, said slack portion permitting opening of the gates.

4. In a hopper construction, a receptacle, said receptacle having a discharge opening, a gate pivotally mounted and movable to open and close the said opening, a chute below said opening, said chute including a pair of side members, one of said side members being connected to said gate, the other side member being connected to the receptacle at the side of the gate, said chute members having their ends connected and having a slack portion in the upper ends thereof when the gates are closed, said slack portion permitting opening of the gate.

5. A hopper construction comprising a receptacle, said receptacle having a discharge opening, a gate movable to open and close said opening, a chute below said opening, said chute including a body having a pair of flexible sides, a front portion and a rear portion, the upper edge of one of said sides being secured to said gate, and means to support the upper edge of the other side for movement towards and from the upper edge of the one side, the upper edges of said front and rear portions being free.

6. A hopper construction comprising a receptacle, said receptacle having a discharge opening, a gate movable to open and close said opening, a chute below said opening, said chute including a body having a pair of flexible sides, a front portion and a rear portion, the upper edge of one side being secured to said gate, and means to support the upper edge of the other side for movement towards and from the upper edge of the one side, the upper edges of said front and rear portions being free, the lower edges of the side and of said front and rear portions being free, the perimeter of the top edge of the chute being greater than the perimeter of the bottom edge of the chute.

GEORGE A. MASHON.